May 31, 1932. W. C. FURNAS ET AL 1,860,499
MOTOR CONTROL SYSTEM
Filed March 3, 1927
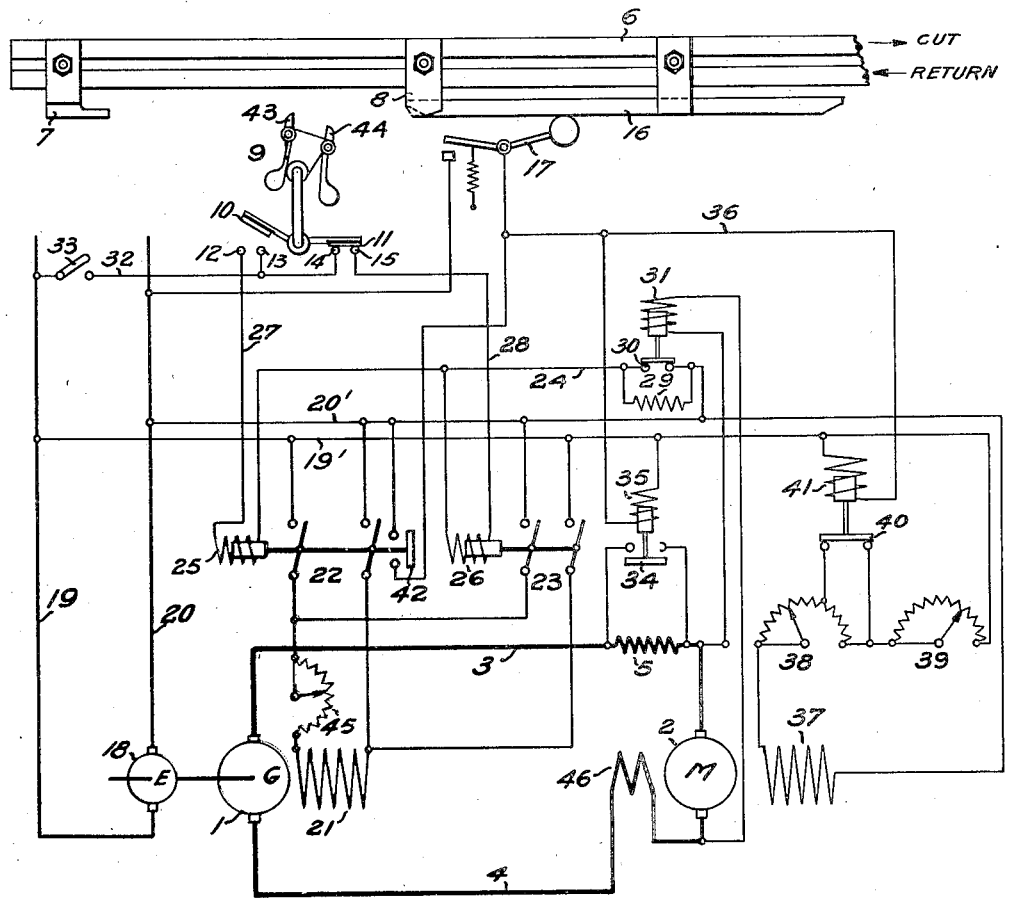

Patented May 31, 1932

1,860,499

UNITED STATES PATENT OFFICE

WILLIAM C. FURNAS AND GEORGE E. COOPER, OF WEST ALLIS, WISCONSIN, ASSIGNORS TO ALLIS-CHALMERS MANUFACTURING COMPANY, OF MILWAUKEE, WISCONSIN, A CORPORATION OF DELAWARE

MOTOR CONTROL SYSTEM

Application filed March 3, 1927. Serial No. 172,239.

This invention relates to motor control systems and is particularly adapted for the control of motors driving elements which must have their direction of motion reversed periodically. The system may be applied for example in the control of a motor for driving a planer table.

Considerable time is wasted in planer drives, for example, in the return stroke when no work is being done on the piece being planed. Hitherto the speed at which a table could be reversed has been limited by a number of factors among which are the momentum of moving parts including the armature of the driving motor and the fact that at high speeds difficulty has been experienced in reversing the motor promptly without injury thereto such as by sparking at the brushes, etc. One of the objects of this invention is the provision of a system whereby high speeds of the order of 200 feet or more a minute may be attained. Another object is the provision of a control system in which the hereinbefore mentioned difficulties are obviated. Another object is an improved control of the driving motor during the cutting or work phase of operation. Still another more specific object is the provision of a bucking series field for the driving motor during the work phase of operation. Other objects will appear hereinafter as the description of the invention proceeds.

The novel features of the invention will appear from this specification and the accompanying drawing forming a part thereof and showing one embodiment of the invention, and all these novel features are intended to be pointed out in the claims.

The single figure of the drawing shows a motor control system, in diagrammatic form, as it may be applied in connection with a planer.

Referring to the drawing, as a source of power for operating the planer a generator 1 is provided, which may be driven in any suitable manner. The generator 1 may be connected to a motor 2 through conductors 3 and 4, there being a resistance 5 interposed in this circuit this resistance being controlled as set forth hereinafter. The motor 2 is adapted to drive the planer table 6. The table 6 is provided with a pair of dogs 7, 8 which are adjustable along the table. These dogs are adapted to operate a master switch 9 by engagement with either one or the other of arms 43, 44. These arms may be in the form of pivoted pawls to prevent accidental jamming of the arms or improper operation by the dogs 7, 8. The master switch is here shown as provided with two contacts 10, 11 adapted to engage relatively stationary contacts 12, 13 and 14, 15 respectively. The contacts 13, 14 may be connected to each other and through a conductor 32 and a control switch 33 to a bus 19 connected to one terminal of an exciter 18 which latter is here shown as directly coupled to the generator 1.

The planer table 6 is also provided with a cam 16, adjustable along the table, adapted to open a normally closed switch 17. The dogs 7, 8 do not engage the switch 17. To this end the dogs 7, 8 and the cam 16 are disposed in different planes. The switch 17 may be adjustably positioned along the planer.

The generator 1 is provided with a field winding 21 which may be controlled in any suitable manner as by a field rheostat 45. The terminals of the field winding 21 may be connected to the movable contacts of the electromagnetic switches 22, 23 respectively. One of the relatively stationary contacts of the switch 22 may be connected to conductor 19' in turn connected to the exciter bus 19. The other relatively stationary contact of switch 22 may be connected to a conductor 20' in turn connected to an exciter bus 20. The relatively stationary contacts of switch 23 are also connected to conductors 19' and 20' but the connections are the reverse of those to switch 22 so that when switch 22 is closed current will flow through field winding 21 in one direction and when switch 23 is closed it will flow through this winding in the other direction. The switches 22, 23 may, if desired, be mechanically interlocked so that only one of them may be closed at a time. The switch 22 may be operated to closed position by means of an operating coil 25 having one of its terminals connected to the contact 12 of the master switch 9. The other terminal of coil 25 may be connected to a conductor 24 in turn connectible through a resistance 29 or a relay contact 30 to the conductor 20'. The switch 23 may be operated to closed position by means of an operating coil 26 one terminal of which is connected through a conductor 28 to the contact 15 of the master relay 9. The other terminal of coil 26 is connected to the conductor 24.

The relay 30 is provided with an operating coil 31 connected across the terminals of the motor 2.

A relay 34 is adapted, when its operating coil 35 is energized, to short circuit the resistance 5. The operating coil 35 has one of its terminals connected to the conductor 19' and the other to a conductor 36 in turn connected to one element of switch 17. The other element of switch 17 is here shown as connected to exciter bus 20.

The motor 2 is provided with a shunt field winding 37 which may be fed from conductors 19' and 20' and which may have a plurality of adjustable rheostats in series therewith, two of which, 38, 39, are here shown. A relay 40 may be provided for controlling a portion of the resistance of rheostat 38 and when the operating coil 41 of this relay is deenergized the relay short circuits the portion of rheostat 38 so that the shunt field current for the motor is increased. The operating coil 41 has one of its terminals connected to conductor 19' and the other to conductor 36. The motor 2 is also provided with a series field winding 46 which is so connected that it bucks the shunt field winding during the cutting stroke of the planer table and is cumulative on the return stroke.

The electromagnetic switch 22 is provided with an auxiliary contact 42 adapted to close a circuit from conductor 20' to conductor 36, through the parallel connected windings 41 and 35 to conductor 19' when the operating coil 25 is sufficiently energized to close switch 22. Windings 41 and 35 are also both simultaneously energized by the closure of cam operated switch 17 which is connected in parallel with the auxiliary contacts 42 of switch 22.

The operation of the system is as follows: Let it be assumed that the generator 1 is running and that the control switch 33 is closed so that coil 26 is energized from the exciter buses 19, 20 the switch 23 being therefore closed and providing a field for the generator in such direction that the motor 2 is operating to return the planer table after the cutting stroke. Let it also be assumed that the planer table is still in a position to the right of that shown so that the cam 16 has not yet engaged the switch 17. It will be noted that there being full voltage across the motor, the coil 31 is effectively energized so that resistance 29 is inserted in the circuit of coil 26. As will appear hereinafter this resistance is not inserted however until the switch 23 is effectively operated so that only a holding current need be provided to maintain the switch 26 closed. It is, of course, also clear that in view of the fact that the switch 17 is normally closed, the relay coil 35 will be energized and the contact 34 short circuits the resistance 5 in the motor circuit. When the planer table approaches the desired end of its return stroke the cam 16 opens switch 17 thereby deenergizing both coils 35 and 41. The deenergization of coil 35 causes the introduction of resistance 5 in the motor armature circuit and the deenergization of coil 41 causes the short circuiting of a portion of the rheostat 38. A predetermined adjustable time after the cam 16 opens switch 17 the dog 8 engages the arm 43 of the master switch 9 and continues its motion to thereby open contact 11 and close contact 10. The opening of contact 11 deenergizes coil 26 thereby opening switch 23. The field winding 21 being no longer supplied with current the voltage of the generator begins to drop toward zero. The closure of contact 10 does not at once fully energize coil 25 for the reason that the resistance 29 is still in circuit therewith and will not be short circuited by relay 30 until the counter voltage of the motor drops to a predetermined value. During the time that switch 23 is open and until switch 25 closes the field winding 21 being no longer excited, the C. E. M. F. of motor 2 will inherently cause dynamic braking current to flow in the motor-generator circuit including resistance 5. The combined influence of these actions is to cause a rapid stopping of the motor 2, even at speeds for the return stroke far in excess of that previously permissible, and a reversal thereof without any sparking at the brushes of the motor when the relay 31 drops so that coil 25 is energized through contact 10 to thereby supply the field winding 21 with current in the opposite direction. The cam 16 is made sufficiently long so that the switch 17 will be maintained in its open position from the time that the switch is first opened until the planer table 6 comes to a stop and reverses its motion. The cam 16 is so positioned with respect to the dog 8 and the switch 17 that the latter switch will be opened by the cam before the switch 22 is closed. The cam 16 may have its left hand end associated with the same support or bracket as the dog 8 so that these two elements are adjustable together. In order to prevent the resistance 5 from being in the circuit and a portion of rheostat 38 being short circuited while the planer table is on the cutting stroke, an auxiliary contact 42 is provided so that when switch 22 closes the switch 17 is by-passed thereby again energizing coils 35, 41 and respectively closing and opening relays 34 and 40. After the coil 25 has been energized it is of course apparent that when the voltage across the motor armature 2 rises to a predetermined value the relay 30 will again insert resistance 29 this resistance being then in the circuit of coil 25.

As the planer table 6 is moved in the direction of the arrow marked "cut" the dog 7 will approach and eventually engage arm 44 of master switch 9 thereby returning the master switch to the position shown in the drawing thereby deenergizing coil 25, and when the counter voltage of the motor has dropped to a predetermined value, energizing coil 26 to thereby reverse the motor 2. The relays 34, 40 remain in the energized position inasmuch as no special means are necessary for controlling the motor 2 because on the cutting stroke the speed of the planer table 6 is relatively quite low. The difference in speed as between the cutting and return strokes may be secured by any suitable control means for the rheostats in the field winding 37 to the end that the total resistance in the motor field circuit will be higher on the return stroke than it is during the cutting stroke. The means for accomplishing this has not been shown inasmuch as it is not necessary to an understanding of applicants' invention this relating particularly to the attainment of a very high speed return stroke and suitable control of the motor to promptly reverse it without sparking. The speed of the motor may also be varied by adjusting the generator field rheostat 45.

The relay 31 and resistance 29 may be omitted if desired. In that case the conductor 24 would of course be directly connected to the conductor 20'. The operation of the system remains the same except that the current in the field winding 21 is reversed as soon as the master switch 9 is thrown over. Nevertheless, the resistance 5 is inserted in the generator-motor circuit and the relay 40 closed before the reversal of field takes place.

It should be understood that it is not desired to limit the invention to the exact details of construction shown and described, for obvious modifications may occur to persons skilled in the art.

It is claimed and desired to secure by Letters Patent:

1. In combination with a driven member adapted to be reversed, a motor for driving said member, a generator connected to said motor, means for reversing the field excitation of said generator, a resistance in the generator-motor circuit, means for normally short circuiting said resistance, means responsive to a predetermined movement of said member for causing the opening of said short circuit, means responsive to further movement of said member in the same direction for causing said field reversing means to interrupt the excitation of said generator and for thereby causing said motor to dynamically brake while said resistance is in said generator-motor circuit, and means for causing said field reversing means to restore the excitation of said generator with reversed polarity when the motor speed reduces to a predetermined value.

2. In combination with a driven member adapted to be reversed, a motor for driving said member, a generator connected to said motor, means for reversing the field excitation of said generator, a resistance in the generator-motor circuit, means for normally short circuiting said resistance, normally inactive means for strengthening the field of said motor, means responsive to a predetermined movement of said member for causing the opening of said short circuit and for causing said field strengthening means to act, means responsive to further movement of said member in the same direction for causing said field reversing means to interrupt the excitation of said generator and for thereby causing said motor to dynamically brake while said resistance is in said generator-motor circuit, and means for causing said field reversing means to restore the excitation of said generator with reversed polarity when the motor speed reduces to a predetermined value.

3. In combination with a driven member adapted to be reversed, a motor for driving said member, a generator connected to said motor, means for reversing the field excitation of said generator, a resistance in the generator-motor circuit, means for normally short circuiting said resistance, means responsive to a predetermined movement of said member for causing the opening of said short circuit, means responsive to further movement of said member in the same direction for causing said field reversing means to deenergize the generator field winding and for thereby causing dynamic braking current to flow through said resistance in said generator-motor circuit, and means controlled by the speed of said motor for causing said field reversing means to subsequently reverse the field excitation of said generator while said member is moving in the same direction.

4. In combination with a driven member adapted to be reversed, a motor for driving said member, a generator connected to said motor, means for strengthening the field of said motor, means for opening the field circuit of said generator, means for reclosing the field circuit in the reversed direction, and means responsive to the movement of said member for first causing operation of said motor-field strengthening means, then of said generator field circuit opening means, and then of said generator field circuit reverse-closing means.

5. In combination with a driven member adapted to be reversed, a motor for driving said member, a generator connected to said motor, means for strengthening the field of said motor from a normal value to a maximum value in a single step, means for reversing the field of said generator, and means responsive to a predetermined movement of said member for first causing operation of said motor-field strengthening means while said generator field is still energized and then effectively controlling said generator field reversing means.

6. In a drive for a reversible member driven by a motor connected to a generator, the method of reversing the motion of said member which includes introducing a resistance into the generator-motor circuit and strengthening the field of said motor, interrupting the generator field circuit while said resistance is in the generator-motor circuit and a predetermined time after said motor field has been strengthened, and then reestablishing said generator field circuit with reversed connections.

7. In a drive for a reversible member driven by a motor connected to a generator, the method of reversing the motion of said member which includes the steps of introducing a resistance into the generator-motor circuit and increasing the field strength of said motor, then dynamically braking said motor by interrupting the generator excitation while said resistance is in said generator-motor circuit, and then reestablishing said generator excitation with reversed polarity when the speed of said motor has decreased to a predetermined value.

8. In a drive for a reversible member driven by a motor connected to a generator, the method of reversing the motion of said member which includes introducing a resistance into the generator-motor circuit and strengthening the field of said motor, interrupting the generator field circuit while said resistance is in the generator-motor circuit and a predetermined time after said motor field has been strengthened, and then reestablishing said generator field circuit with reversed connections after the speed of said motor has decreased to a predetermined value.

9. In combination with a driven member adapted to be reversed, a motor for driving said member, a generator connected to said motor, means for supplying the field winding of said generator with energy including two switches one of which is connected to cause the energy supply to be in one direction and the second of which is connected to cause the energy supply to be in the other direction, a resistance in the generator-motor circuit, a relay for closing and opening a short circuit around said resistance, a resistance in the field circuit of the motor, a relay for closing and opening a short circuit around said motor field resistance, a switch for controlling said relays, means associated with said driven member for operating said controlling switch to cause the first named relay to open the short circuit around the generator-motor circuit resistance and to cause said second named relay to close the short circuit around said motor field resistance when said driven member moves in a given direction and reaches a predetermined position, means including a switch for controlling said generator field switches, means associated with said driven member for operating said generator-field-switch-controlling means to cause the first named of said generator field switches to open when said driven member has traveled further in the same direction and said relays are still in position as determined by said first named means associated with said driven member, and means responsive to a predetermined condition of the motor for causing the second named generator field switch to close.

10. In combination with a driven member adapted to be reversed, the expenditure of work necessary to drive said member in one direction being greater than in the other, a motor for driving said member, a generator connected to said motor, a resistance and a series field winding for said motor in the generator-motor circuit, said series field winding being wound so that it bucks the motor shunt field on the stroke requiring the greater expenditure of work, means for normally short circuiting said resistance, means responsive to a predetermined movement of said member on the stroke requiring the lesser expenditure of work for causing the opening of said short circuit, means responsive to further movement of said member in the same direction for first causing the opening of the field winding circuit of said generator while said resistance is in the generator-motor circuit and subsequently reclosing the generator field winding circuit in the reversed direction while said resistance is still in the generator-motor circuit.

11. In combination with a driven member adapted to be reversed, a motor for driving said member to perform work and idle strokes, a generator connected to said motor, a field winding for said generator, means for reversing the direction of current in said generator field winding, a field winding for said motor, means for separately exciting said motor field winding, a series field winding for said motor, means for interrupting the field excitation of said generator near the end of each stroke so as to cause said motor to dynamically brake, and means for restoring said generator field excitation in an opposite direction after the speed of said motor has been reduced by said braking to a predetermined value, means for connecting said series field winding so that it bucks the separately excited field winding of said motor during said work stroke and during dynamic braking at the end of the idle stroke and so that said series winding assists the separately excited field winding of said motor during said idle stroke and during dynamic braking at the end of the work stroke.

In testimony whereof the signatures of the inventors are affixed hereto.

WILLIAM C. FURNAS.
GEORGE E. COOPER.